United States Patent

Jilbert

[15] 3,656,055
[45] Apr. 11, 1972

[54] INTERFACE DETECTION APPARATUS HAVING A SIDE ARM DETECTOR WITH THREE ELECTRODES

[72] Inventor: Phillip Harvey Jilbert, Tadley, England

[73] Assignee: United Kingdom Atomic Energy Authority, London, England

[22] Filed: Oct. 6, 1969

[21] Appl. No.: 863,956

[30] Foreign Application Priority Data

Oct. 15, 1968 Great Britain.....................48,918/68

[52] U.S. Cl..........................................324/61 R, 73/304 C
[51] Int. Cl.................................................G01r 27/26
[58] Field of Search ...................324/61; 317/246; 73/304 C; 23/232, 253, 254; 340/200, 258; 204/195

[56] References Cited

UNITED STATES PATENTS

| | | | |
|---|---|---|---|
| 2,622,442 | 12/1952 | De Boisblanc et al. | 73/304 C |
| 2,720,624 | 10/1955 | Gunst et al. | 324/61 |
| 3,212,077 | 10/1965 | Edwards | 340/200 |
| 3,285,068 | 11/1966 | Morris | 73/304 C |
| 2,919,579 | 1/1960 | Gronner | 73/304 |
| 2,577,612 | 12/1951 | Fay | 324/61 |
| 3,224,275 | 12/1965 | Fahley | 73/304 |

Primary Examiner—Edward E. Kubasiewicz
Attorney—Larson, Taylor & Hinds

[57] ABSTRACT

To detect the interface between two fluids (two liquids or a gas and a liquid) flowing in a duct and having different electrical properties, three electrodes are located at a position along the duct, two of the electrodes forming with the third a pair of capacitors displaced from one another in the direction of flow so that substantially separate fluids are present between the electrodes forming the respective capacitors at a given position of the interface. The two capacitors form two arms of an AC bridge and a circuit detects the out-of-balance output from the third electrode when the interface reaches the electrodes. Preferably the electrodes are formed by three insulated wires extending into the duct from a side-arm to leave an air-pocket between the liquid surface and the surface from which the wires extend. The apparatus has application in liquid phase-separation apparatus for chemical analysis.

11 Claims, 6 Drawing Figures

INTERFACE DETECTION APPARATUS HAVING A SIDE ARM DETECTOR WITH THREE ELECTRODES

BACKGROUND OF THE INVENTION

This invention relates to apparatus for detecting the interface between two fluid phases flowing in a duct, and has one application in liquid phase-separation apparatus for use in chemical analysis. Such chemical analysis may, for example, involve the extraction of a chemical substance from an aqueous into an organic phase immiscible therewith. The mixed liquids are allowed to settle under gravity, when the less dense phase separates out above the denser phase (ie, the organic above the aqueous, or vice versa), with an interface between them. The phases can then be separated by allowing the lower phase to run out through a tap which is closed when the interface falls thereto, and it is one object of the present invention to provide apparatus suitable for this purpose. In one such apparatus having a similar function, the interface is detected by electrically conducting probes which contact the liquids. Such an arrangement has disadvantages, particularly where the organic phase may be inflammable or produce an inflammable vapour, and the present invention provides an alternative apparatus for this function.

The invention can also be used to detect the interface between a liquid and a gas above the liquid.

SUMMARY OF THE INVENTION

According to the present invention apparatus for detecting the interface between two fluid phases having different electrical properties flowing in a duct comprises electrode means located at a position along the duct and adapted to form a pair of capacitors displaced from one another in the direction of flow so that substantially separate fluids are present between the electrodes forming the respective capacitors at a given position of the interface, a bridge circuit whereof said pair of capacitors are connected in series to form two arms, means for applying an AC voltage across said bridge, and means connected to the junction of said pair of capacitors for detecting changes in the AC output of the bridge.

The capacitors may be of approximately equal capacitance when the same fluid is present between the electrodes forming each, said detecting means being arranged to detect the presence of an out-of-balance signal.

The electrode means may comprise three electrodes, two of the three forming with the third electrode said pair of capacitors and said detection means being connected to said third electrode.

The two electrodes may encircle the duct with the third electrode located within the duct. The third electrode may be coated with electrically insulating material.

Preferably, however, the electrodes are located within the duct and extend from mounting means located within a side-arm of the duct, the side-arm being arranged to provide a liquid-free volume between the liquid in the duct and the mounting means. Conveniently the side-arm extends at an upward angle from the duct. The duct may include a downwardly tapering portion formed at the junction with the side-arm, the electrodes being located within the tapering portion.

The electrodes located within the duct preferably comprise three elongated conductors extending generally along the duct and coated with electrically insulating material which may be a glaze. These electrodes may be formed by end-portions of three conductors extending parallel to one another from the mounting means, the end-portions of two of the conductors being turned towards the third conductor and extending parallel thereto in opposite directions from a common position along the third conductor to form the two capacitors. To increase the electrode area, and hence the capacitance, these end-portions, and the adjacent end-portion of the third conductor, may be doubled back on themselves.

Conveniently the axes of the three electrodes are located approximately at three adjacent apexes of a regular pentagon with the third electrode at the middle apex, the axes of the conductors extending from the two electrodes to the mounting means being located approximately at the remaining two apexes.

Preferably the three electrodes are mounted with the third electrode towards the lower side of the side-arm.

The bridge circuit output from the third electrode may be connected to a detector circuit having a high input impedance, but is preferably connected to a detector having a low input impedance relative to the total bridge capacitance so that out-of-balance current rather than out-of-balance voltage may be detected when low-conductivity fluids are used.

Control means operated by the bridge circuit output may be arranged to control a tap connected in series with the duct. The control means may be arranged so that when the bridge is balanced the tap is open and remains open when the bridge becomes unbalanced, but closes when the bridge becomes rebalanced.

DESCRIPTION OF THE DRAWINGS

The nature of the present invention will readily become apparent from the following description of exemplary embodiments with reference to the accompanying drawings wherein.

DESCRIPTION OF AN EMBODIMENT

Figure 1:
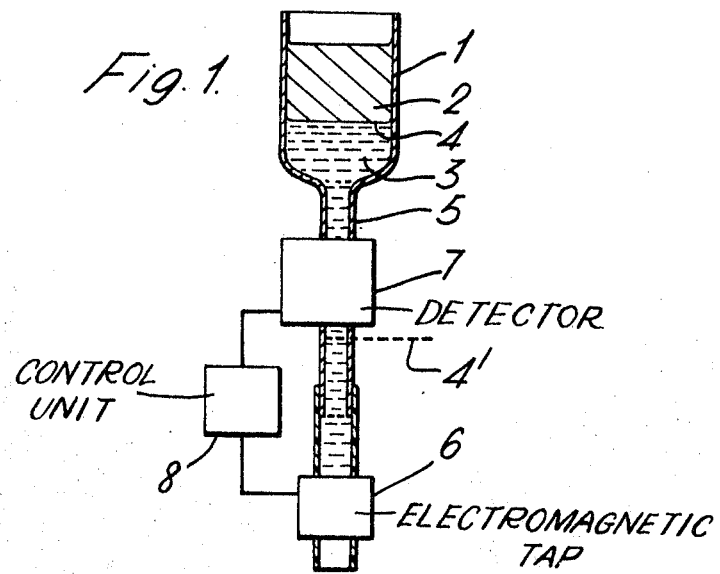
FIG. 1 is a diagrammatic sectional elevation showing the application of one form of present invention to a liquid phase-separator.

FIG. 1 shows a vessel 1 containing an organic liquid 2 and an aqueous solution 3 having an interface 4. For example the aqueous solution may be urine and the organic liquid ether into which a substance has been extracted from the urine for estimation, after which the mixture of liquids has been allowed to settle. A glass tube or duct 5 extends from the bottom of the vessel to an electromagnetic tap 6 and a detector 7 is located on tube 5 between the tap and the bottom of the vessel. A control unit 8 is connected between detector 7 and tap 6 to close the tap, which is initially open, before the interface reaches the tap, thereby effecting separation of the two phases in vessel 1. The position of the interface when the tap closes in the present embodiment is indicated by the line 4'.

Figure 2:
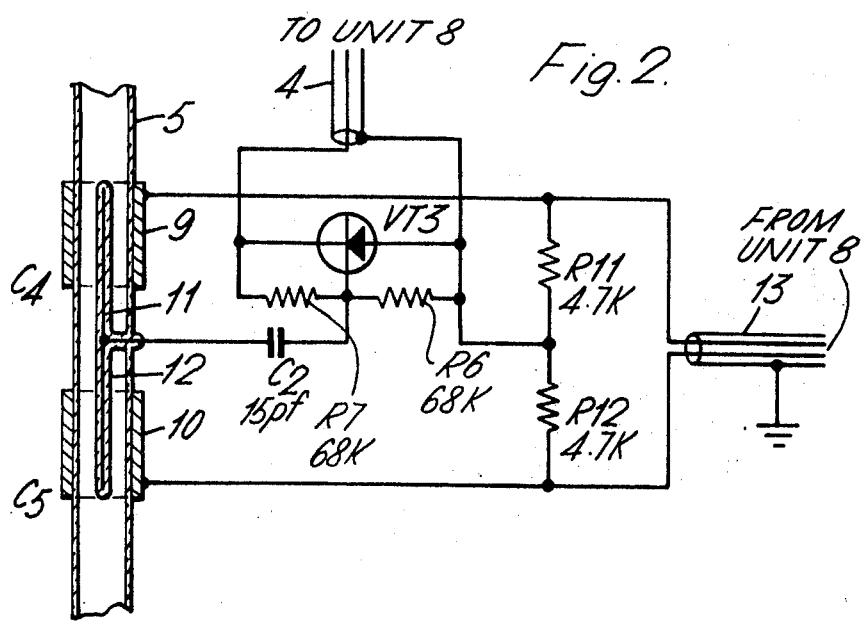
FIG. 2 of a diagram showing an electrode assembly and bridge circuit in the arrangement of FIG. 1.

FIG. 2 shows the detector 7 in detail. Two similar cylindrical outer electrodes 9 and 10 each 12 mm long are attached to the tube 5 by clamps (not shown) made of flexible beryllium copper. The single inner electrode 11 is made of 0.50 mm NILO-K wire and is 36 mm long. A coating 12 of glass not thicker than 0.10 mm acts as an electrical and chemical insulator. The electrical insulation increases the safety of the detector, especially when inflammable organic compounds are involved.

The coated inner electrode 11 positioned approximately coaxially in the tube 5 enables good matching of the two capacitors C4, C5 which it forms with electrodes 9 and 10 to be obtained merely by spacing the cylindrical electrodes symmetrically about the centre of electrode 11. Since the glass tube walls, of 1 cm OD and 0.8 cm ID, are virtually uniform over short lengths, the capacitors C4 and C5 are balanced for all fluids including air. Accurate balancing can be obtained by slightly moving the electrodes 9 and 10 up or down the tube 5 before tightening the clamps. Capacitors C4 and C5 are connected in an AC bridge circuit, of which they form two arms and R11 and R12 the other two.

The general operation of the arrangement of FIGS. 1 and 2 is as follows. When the vessel 1 is to be emptied of the lower liquid phase 3, the unit 8 is activated. This opens the tap 6 and the interface 4 drops. When the interface 4 enters the upper capacitor C4 an un-balance signal appears at the electrode 11. This signal is large enough to operate a trigger circuit which, while holding the tap open, disarms a tap closure circuit. When the upper liquid phase 2 fills capacitors C4 and C5 the signal disappears and the trigger circuit re-operates to close the tap. The interface is now at 4'.

It will be seen that this leaves a small volume of the lower liquid solution 3 trapped between the interface 4' and the tap 6. In order to recover this small volume, eg, for recycling with ether to achieve maximum extraction of the wanted substance from the urine sample, several small-volume washes with the solvent of solution 3, eg distilled water, may be required. This is achieved by exploiting the natural small delay in the electromagnetic tap and allowing a fixed volume of the solvent of solution 3 to flow at a controlled rate into vessel 1. The rising interface 4' unbalances the bridge thus opening the tap 6 and allowing the interface to drop again. When the bridge is rebalanced, the interface passes beyond the balance point owing to the relatively slow reaction of the tap. This hysteresis effect provides the means for continuous, small-volume washes. The effect is to flush the urine out of the aforementioned trapped volume and to leave it filled with, eg, distilled water.

The rate of flow of the flushing solvent is made not greater than the emptying rate. This ensures that the volume to be flushed is kept to a minimum.

The liquid phases can be as depicted in FIG. 1 or their locations can be reversed. Typical electrical data for such liquids are:

|  | Relative Dielectric Constant | Exemplary Conductivity |
|---|---|---|
| Aqueous soln. 3 | 80 | $2 \times 10^{-3}$ mHo |
| Organic phase 2 | 4 | $2 \times 10^{-8}$ mHo |

The presence of the flushing liquid in the upper capacitor C4 can be sufficient to turn the tap on during flushing periods. Consequently a threshold is preferably included in the trigger circuit to avoid this effect.

The control system is free of mains pickup since the detector is of bridge design. The coaxial electrode configurations, hitherto described as capacitors, are in fact complex impedances involving real and imaginary parts, since the conductivity of the aqueous phases cannot be ignored. By designating the electrode configurations containing different phases as impedances $Z_1$ and $Z_2$ it can be shown that the bridge output amplitude is $$\frac{V \sin wt}{2} \cdot \frac{Z_2 - Z_1}{Z_2 + Z_1}$$

where $V \sin wt$ is the bridge excitation voltage.

The highest output impedance of the bridge is about 33 kΩ at 1.5 MHz representing a capacity of 3 pf. Because of this a buffer circuit is provided having an input capacity of approximately 1 pf and an input impedance of 10 MΩ. The low input capacitance is obtained by bootstrapping both the emitter and the collector, remotely from the control unit, of an input transistor.

Figure 3:
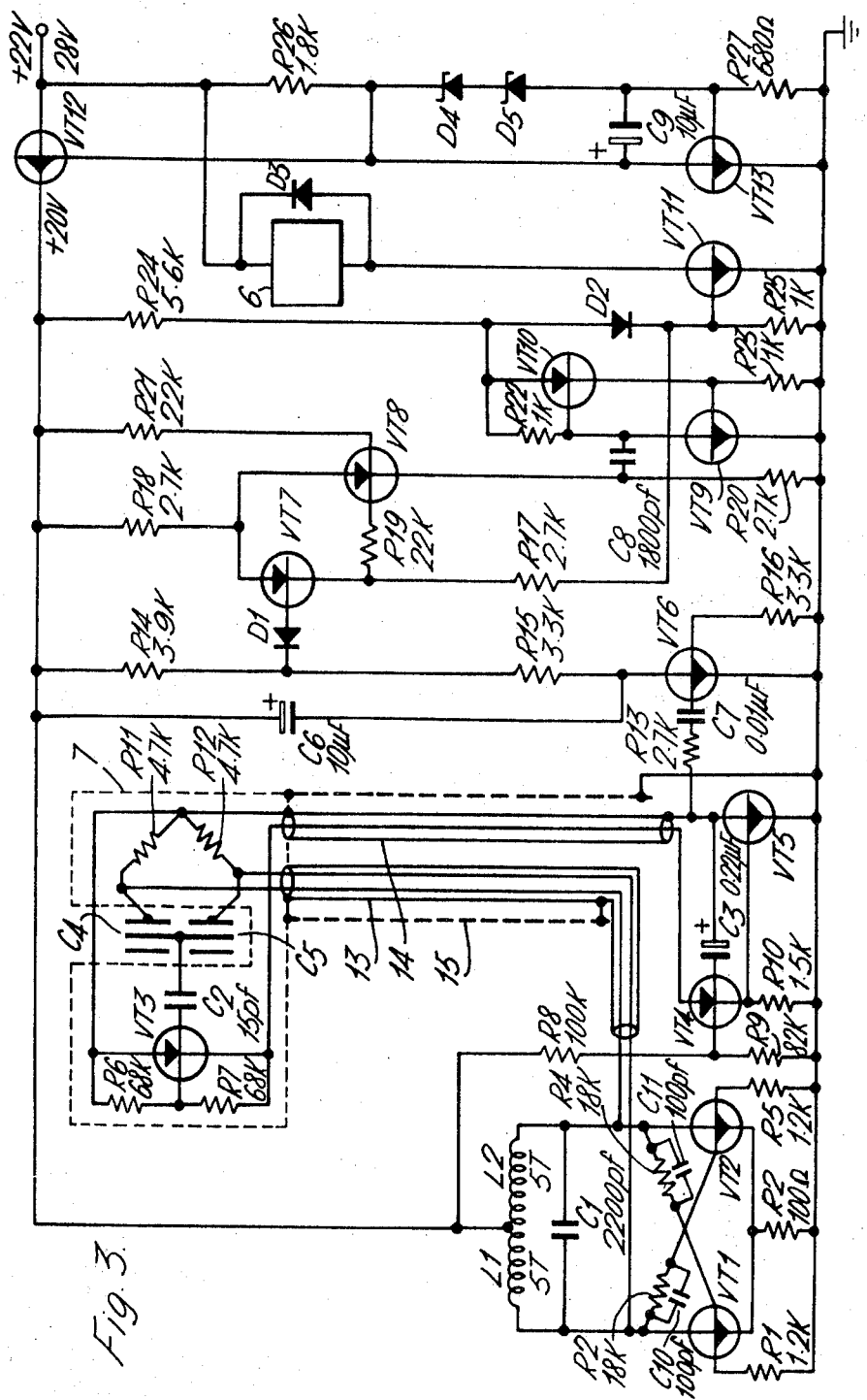
FIG. 3 is a diagram of a circuit for controlling a tap in the arrangement of FIG. 1.

Referring now to FIGS. 2 and 3, VT3 is the input transistor and resistors R11 and R12 in parallel act as its emitter load resistor as well as forming the two other arms of the bridge. The screened twisted-pair cable 13 which provides the bridge with AC excitation also provides the DC current for VT3, VT4 and VT5. The base potential of VT4 is defined by R8 and R9. R6 and R7, using the emitter of VT4 as a reference, determine the quiescent voltage of VT3 emitter. The $V_{BE}$ of VT5 and R10 fixes the current in VT3 and VT4.

The dynamic operation of the circuit is as follows.

An AC signal appearing at the base of VT3 produces a current which drives the base of VT5 via VT4. VT5 applies an in-phase signal to the emitter of VT3 directly and to the base of VT4 via C3. Thus both the emitter and collector of VT3 follow the base signal very closely. This reduces the effective input capacitance by over 1,000 times and increases the input impedance to 10 MΩ.

The 180 pf of stray capacitance in the cable 14 connecting the collector of VT3 to the emitter of VT4 in the control unit 8 would be sufficient to cause VT4 and VT5 to become unstable. This is overcome by using a coaxial cable with the outer screen attached to the output of the buffer circuit formed by VT3, VT4 and VT5, and the core connecting VT3 collector to VT4. The core and the screen are in phase, thus rendering the cable capacitance insignificant.

Both cables can be up to 15 feet long and are enclosed in a screen 15 as an anti-radiation measure to protect nearby equipment. The construction of the bridge and buffer circuit minimises the stray input capacitance and pick-up of the AC excitation signal produced by the 1.5 MHz oscillator circuit VT1, VT2. C2 fixes the minimum source impedance presented to the buffer circuit to produce stability.

The base-emitter junction of VT6 together with R13 and R16 serve the dual purpose of rectifying the AC output signal and acting as a threshold. VT6 acts as an amplifier and C6 with R14 and R15 forms the integrator. R15 limits the excursions of VT7 base.

R17, R18 and R20 are made equal and eight times smaller than R19 and R21. This arrangement causes VT7 and VT8 to form a Schmitt trigger circuit which turns on at half the HT voltage and is turned off by a fall of one-fifth of the HT voltage. Diode D1 protects the $V_{BE}$ of VT7 from large reverse voltages.

When the control circuit is activated by application of the HT voltage, the tap 6 is opened by R24 and D2 supplying base current to VT11 which energizes the tap solenoid. The complementary bistable pair VT9, VT10 is non-conducting. The bridge is balanced (no output) so VT6 and VT7 are both non-conducting. VT8 is bottomed with its collector sitting at half HT voltage. When the bridge becomes unbalanced, its output switches VT6 and VT7 on and VT8 off so that the discharge of C8 triggers the bistable pair VT9, VT10 on. The bistable pair cuts D2 off permanently but VT7 now keeps VT11 conducting and so the tap 6 remains open. A rebalance of the detector switches VT7 off and therefore VT11 off, thus closing the tap.

Multiplexing can be used, ie one control unit 8 switched in turn to a plurality of separators each having a detector 7 and a tap 6. It is thus convenient to switch the control unit on and off to reset the bistable circuit VT9, VT10. As a precaution a voltage stabiliser circuit, VT12, VT13, is included which provides, by virtue of C9, a slow HT rise time (0.1 secs), when switched on, in order to avoid triggering the bistable.

The detection sensitivity of the apparatus depends inter alia on the OD/ID ratio of the tube 5, which is preferably not greater than 1.25.

DESCRIPTION OF PREFERRED EMBODIMENT

The embodiment described with reference to FIGS. 1–3 is satisfactory for use with electrically non-conducting liquids, and with electrically conducting liquids provided the latter are only allowed to run through the tube 5 comparatively slowly. This is because if the aqueous (conducting) solution runs out quickly it leaves a conducting film over the inside of the glass which is not immediately removed by the following organic (non-conducting) phase. This film can effectively form a short-circuit between electrodes 9 and 10 on the inner surface of the glass which prevents the apparatus functioning properly.

Figure 4:
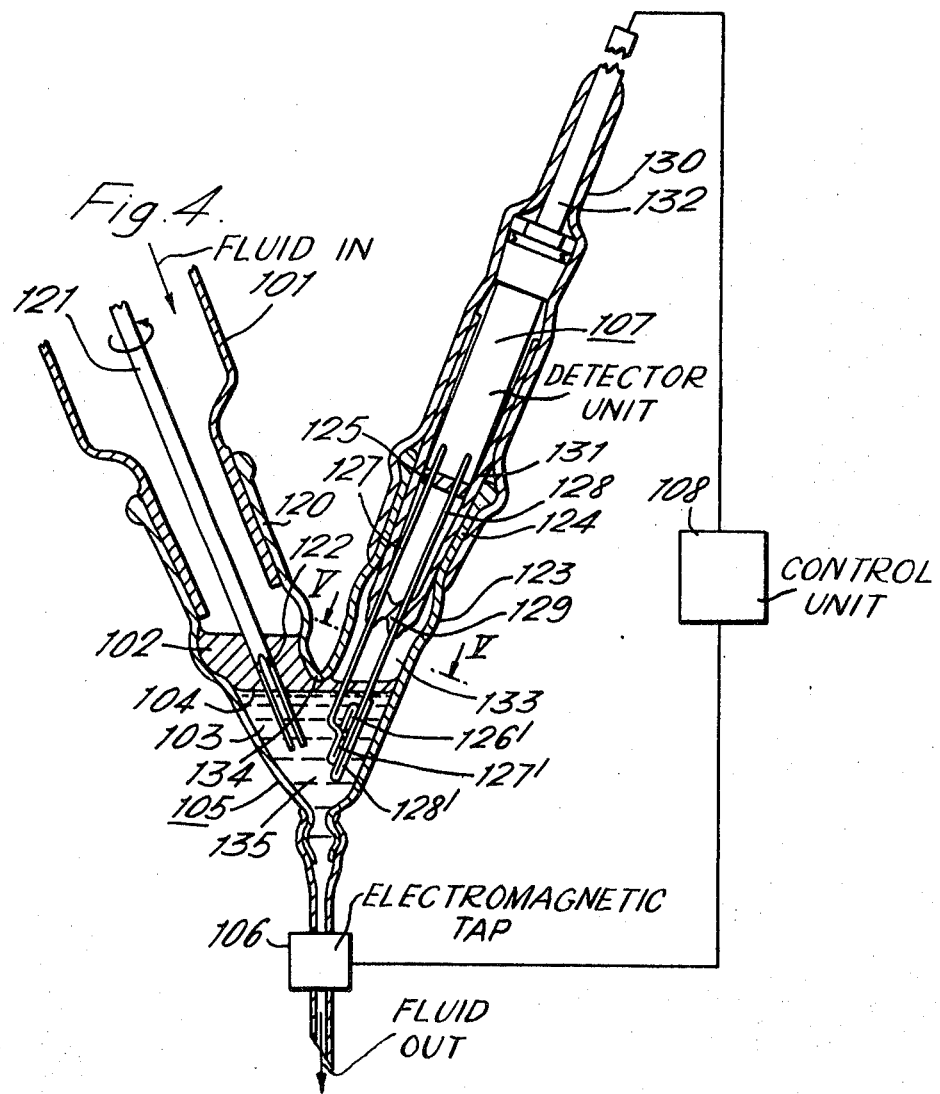
FIG. 4 is a partially diagrammatic sectional elevation of a preferred form of the invention applied to a liquid phase-separator.

The embodiment shown in FIG. 4 substantially overcomes this difficulty. In FIG. 4 a duct 105 extends from a vessel 101 to which it is connected by a cone joint 120. A rotatable stirring rod 121 having a hollow end provided with a transverse hole 122 extends into duct 105. The duct 105 and vessel 101 are inclined at an angle of about 22.5° to the vertical and a side-arm 123 extends from duct 105 at a similar angle to the vertical, making an angle between them of 45°, but these angles are not critical. At the junction with the side-arm, the duct forms a downwardly tapering portion 135. Side-arm 123 terminates in a cone seal 124 in which a hollow glass member 131 is an airtight fit. Within member 131 is a transverse insulating disc 125 which locates three parallel wires 126, 127 and 128 passing through it. These wires are sealed through the glass at the end of member 131 as shown at 129. Wire 126 is hidden behind wire 127 in FIG. 4 but is seen in cross-section in FIG. 5.

Figure 5:
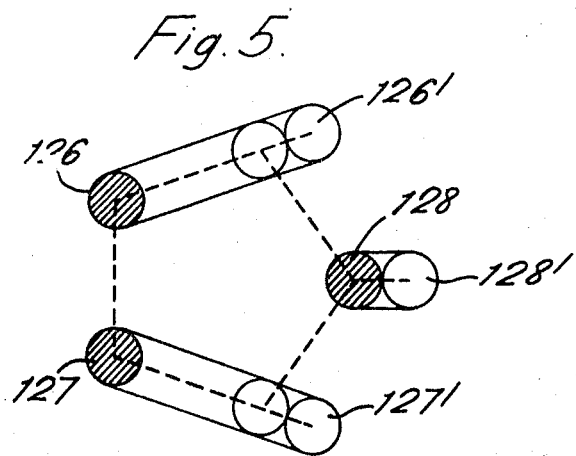
FIG. 5 is a section on the line V—V of FIG. 4.

The wires 126–128 extend from the mounting means formed by member 131 into the portion 135 of duct 105. Wire 128 is doubled back on itself at 128'. Wire 127 is bent towards wire 128' midway along the latter and extends away from unit 107 parallel to wire 128', being doubled back on itself at 127'. Similarly wire 126 is bent towards wire 128' midway along the latter and extends towards unit 107 parallel to wire 128', being doubled back on itself at 126'. The doubled-back portions of the wires are conveniently located at three adjacent apexes of a regular pentagon as shown in FIG. 5, with wires 128/128' at the middle apex of the three and wires 126/126' and 127/127' at the remaining two apexes. This orientation is not essential however. The electrodes extend generally along the duct, and the fact that they are not parallel to the direction of flow or normal to the interface is immaterial.

The doubled-back portions of wires 126 and 127 form with the doubled-back portion of wire 128 a pair of substantially equal-value capacitors displaced from one another in the direction of flow of the liquid in duct 105. The doubling-back increases the electrode areas and hence the capacitance. Suitably the wires may be of 1 mm diameter Nilo-K and coated with 0.001 inch of Kodial glass to insulate them from the liquid. This thickness will withstand about 1 kV. In one embodiment the doubled-back portion of wire 128 is 16 mm long, and the doubled-back portions of wires 126 and 127 are each 6 mm long. Their separation is shown in FIG. 5, where the apexes of the pentagon lie on a circle of 5 mm diameter. FIG. 4 is approximately to scale, the internal diameter of side-arm 123 at the line V—V being about 10 mm.

The portions of wires 126–128 extending behind disc 125 form the pins of a plug which engage sockets in a cylindrical detector unit 107 inserted into the open end of member 131. The electronic components mounted in unit 107 are not shown in FIG. 4, but will be described with reference to FIG. 5. Unit 107 is connected to control unit by a cable 132. For protection, a rubber or plastics sleeve 130 embraces cable 132, unit 107, member 131 and joint 124.

The circuit of FIG. 6 operates in a manner broadly similar to that of FIG. 3 and only the important differences therefrom will be described. The most important of these is that transistor VT 103 in detector unit 107 is now arranged to have a low input impedance, in contrast to the high input impedance of transistor VT 3 in FIG. 3. This causes the transistor to measure the out-of-balance current from electrode 128/128', which forms the common "plate" of the bridge capacitors C 104 and C 105, rather than the out-of-balance voltage at this electrode. This is advantageous because the out-of-balance voltage is proportional to $(\delta c/\Sigma c)\cdot(V/2)$, where $\delta c$ is the change in one of the two capacitors produced by the change of liquid between the electrodes, $\Sigma c$ is the total value of both capacitors plus stray capacitances, (eg, of the leads from disc 125), the $V$ is the AC voltage applied across the bridge. The out-of-balance current, on the other hand, is proportional to $\delta c\cdot(V/2)$, and therefore provides more sensitive detection of the out-of-balance condition. The preference for current detection rather than voltage detection applies also to the electrode configuration of FIG. 2. However current detection is not an essential feature of the invention.

Figure 6:
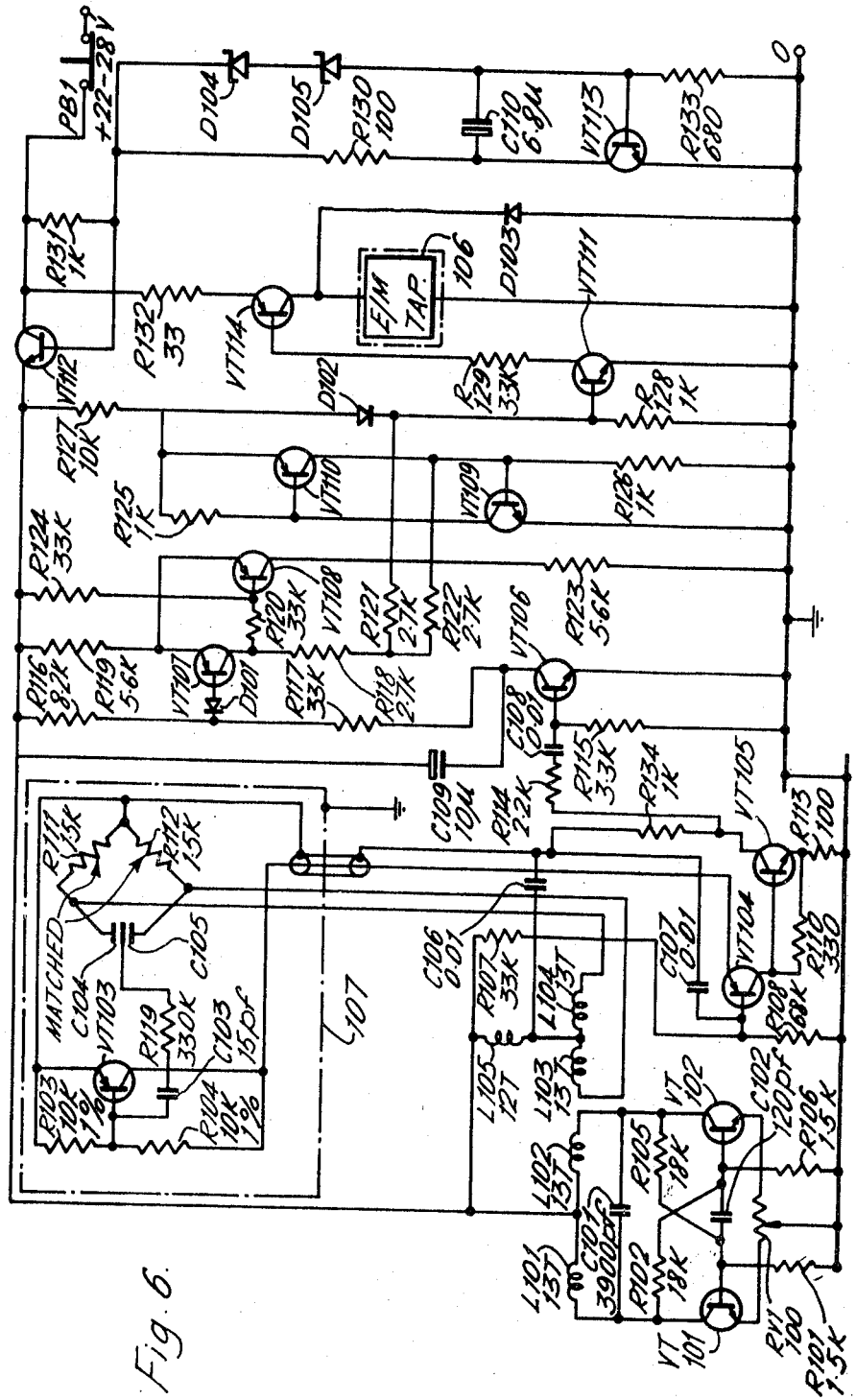
FIG. 6 is a diagram of a circuit for controlling a tap in the arrangement of FIG. 4.

In FIG. 6 an AC voltage at 240 kHz is produced by oscillator VT 101, VT 102 and is applied across the bridge via secondary windings L 103 and L 104. The junction of these windings is connected to the junction of bridge resistors R 111 and R 112 by a capacitor C 106. Effectively this connects the emitter of VT 103 to the positive supply via L 105, which resonates with C 106 at 240 kHz so that the impedance between the bridge junction and the positive supply is only about 1 ohm. The emitter of VT 103 therefore no longer follows the base and the input impedance at the base is low. VT 103 thus acts as a current detector rather than a voltage detector. This increases the detection sensitivity as described above, and is especially useful where the difference in dielectric constants between two low-conductivity fluid phases is relatively low, eg, about 1, as between petroleum spirit (dielectric constant 1.95) and air.

The inter-electrode capacitances in a high-conductivity liquid, eg, an aqueous solution, are largely determined by the thickness of the glass coatings and are thus relatively large. With a high detection sensitivity it would be difficult to match C 104 and C 105 sufficiently closely to achieve an initial balance of the bridge when the duct was full of such a liquid. By inserting the resistor R 119 of 330 k ohms (the value is not critical) in series with the base of VT 103, the sensitivity for detecting the interface under low-conductivity conditions is little altered. This is because $\Sigma c$ is then too small to substantially shunt R 119.

On the other hand, with a high-conductivity liquid the value of $\Sigma c$ is large because of the above "glass coating" effect and $\Sigma c$ has a much lower impedance than R 119. Thus under these conditions the circuit acts as a voltage detector, and the initial balancing of the inter-electrode capacitances C 104 and C 105 is much less critical because of the reduced detection sensitivity.

The out-of-balance signal fed to VT 103 produces an output voltage across R 134 in the collector connection of VT 105, which is fed to VT 106.

In the remainder of FIG. 6 transistors having functions corresponding to those in FIG. 3 are identified by corresponding numerals plus "100". It will be seen that the bistable pair VT 109, VT 110 is now triggered from VT 107 via R 122, and that the electromagnetic tap 106 is not connected directly in the collector circuit of VT 111 but in the collector circuit of VT 114 controlled thereby. The tap 106 is initially energized to open it by closing push-button switch PB 1.

Capacitor C 102 suppresses switching transients in VT 101 and VT 102 and so improves the waveforms. RV 1 is adjusted to obtain the best waveform shape.

The operation of the apparatus is similar to that already described with reference to FIGS. 1–3. FIG. 4 shows the electrodes immersed in the lower (aqueous) phase 103. It will be seen that the arrangement leaves an air-pocket 133 between the surface of the upper phase 104 and the end of member 124 at 129 from which the electrodes extend. The end of member 129 thus always remains dry, and no conducting film can form between the coated electrodes.

As mentioned previously, the operation of the apparatus depends not only on the different dielectric constants of the liquids, but on their different electrical conductivities. Indeed the latter may be the dominant effect. This is because in a highly conductive liquid, the outer surfaces of the glass coatings on the electrodes may be considered to be interconnected by a good conductor, and the inter-electrode capacitance is determined mainly by the thickness of the coatings. To achieve good initial balance it is therefore important that these coatings should be as uniform as possible, and also that equal lengths of the wires 126 and 127 extending from end 129 should be immersed. The latter condition is met by aligning the wires to be normal to the line of intersection of the liquid surface and the plane containing the two wires.

When the upper liquid is non-conducting (eg, organic) and the lower liquid conducting (eg, aqueous) as shown, the electrodes may either by oriented as shown, with electrodes 126/126' and 127/127' uppermost, or vice versa. However in applications in which the upper liquid is conducting, the illustrated orientation is preferred. This is because as the interface falls in vessel 101 and reaches the corner 134 between the duct and the side-arm, the upper liquid floods round the corner into the side-arm. If electrode 128/128' were uppermost, the conducting liquid would encounter it first and then encounter the other two electrodes. As it is unlikely to encounter the latter simultaneously, an unbalance condition would be momentarily created which might be sufficient to operate the circuit and close the tap.

A further advantage of the embodiment of FIGS. 4 and 5 is that the small electrode size allows the use of a small sample of the lower liquid, eg, 3 mls, and allows the stirrer 121 to extend into the portion 135 occupied by the electrodes so that virtually all of the sample is subjected to mixing action.

Although primarily intended for detecting the interface between two liquids, the invention can also be used, as mentioned, to detect the interface between a single liquid and air or other gases, eg, if vessel 101 contains single liquid such as petroleum spirit, with air above, the apparatus will detect when the surface of the spirit falls to the level of the electrodes.

I claim:

1. Apparatus for detecting the interface between two liquid phases having different electrical properties flowing in a tube comprising: a tube for the flow of said two liquid phases; a side-arm joined to said tube and extending therefrom at an acute angle, and means for sealing said side-arm from the external atmosphere; three elongated insulated electrodes extending into said tube; a conductor for supporting each of said electrodes; means for insulatedly mounting said conductors within said side-arms, two of said elongated electrodes extending substantially parallel to the third electrode in a direction which has a component along the tube, said two electrodes being longitudinally displaced from one another to form, with said third electrode, first and second capacitors displaced one from the other along the tube, said capacitors being of approximately equal capacitance when the same liquid is present between the electrodes forming each said capacitor; a bridge circuit including means for connecting said first and second capacitors in series to form two arms of said bridge circuit and including two further series-connected impedances of approximately equal value forming the other two arms of said bridge circuit; means for applying an AC voltage across said series-connected capacitors; and means connected between the junction of said two capacitors and the junction of said two further impedances for detecting the occurrence of an out-of-balance output signal from the bridge circuit.

2. Apparatus as claimed in claim 1 wherein said two electrodes are of substantially equal length and are substantially equispaced from said third electrode.

3. Apparatus as claimed in claim 2 wherein the end-portions of said two of the conductors and the adjacent end-portion of the third conductor are doubled back on themselves.

4. Apparatus as claimed in claim 1 wherein said three electrodes are constituted by end-portions of said supporting conductors, said conductors extending substantially parallel to one another from within said side-arm, the end-portions of said two conductors being turned towards said third conductor and extending substantially parallel to said third conductor in opposite directions from a common position along said third conductor.

5. Apparatus as claimed in claim 1 wherein both said electrodes and supporting conductors are thinly coated with electrically insulating material.

6. Apparatus as claimed in claim 1 wherein said tube and said side-arm conjoin to form a tapered portion of said tube and said capacitor-forming electrodes are located within said tapered portion.

7. Apparatus as claimed in claim 1 wherein the axes of the three electrodes are located approximately at three adjacent apexes of a regular pentagon with the third electrode at the middle apex, the axes of the conductors extending from the two electrodes into the side-arms being located approximately at the remaining two apexes.

8. Apparatus as claimed in claim 7 wherein the three electrodes are oriented with the third electrode towards the side of the side-arm which is opposite the acute angle.

9. Apparatus as claimed in claim 1 further comprising a detector circuit connected to the output of said bridge circuit and having a low input impedance relative to the total bridge capacitance so that out-of-balance current rather than out-of-balance voltage may be detected when low-conductivity liquids are used.

10. Fluid phase-separation apparatus comprising a vessel having a tube leading from the lower end thereof, said tube being provided with interface detection apparatus as claimed in claim 1.

11. Apparatus as claimed in claim 1 wherein said bridge circuit comprises, as said two further impedances, resistors of substantially equal value.

* * * * *